United States Patent [19]

Kobayashi et al.

[11] Patent Number: 4,849,482

[45] Date of Patent: Jul. 18, 1989

[54] PROCESS FOR SUSPENSION POLYMERIZATION OF VINYL CHLORIDE IN A REACTOR EQUIPPED WITH A REFLUX CONDENSER AND A MODIFIED BRUMAGING IMPELLER

[75] Inventors: Teiji Kobayashi, Takasago; Yoshio Tomishima, Kobe; Taizo Yamamoto, Takasago; Yasuhiro Nojima, Akashi, all of Japan

[73] Assignee: Kanegafuchi Kagaki Kogyo Kabushiki Kaisha, Osaka, Japan

[21] Appl. No.: 68,711

[22] Filed: Jun. 30, 1987

Related U.S. Application Data

[63] Continuation of Ser. No. 816,529, Jan. 6, 1986, abandoned.

[30] Foreign Application Priority Data

Jan. 10, 1985 [JP] Japan .................................. 60-3115

[51] Int. Cl.[4] .............................................. C08F 2/20
[52] U.S. Cl. ........................................ 526/78; 526/80; 526/81; 526/88
[58] Field of Search ................... 526/78, 80, 81, 88

[56] References Cited

U.S. PATENT DOCUMENTS

| | | | |
|---|---|---|---|
| 3,183,208 | 5/1965 | Jurgeleit | 526/201 |
| 3,692,718 | 9/1972 | Golstein | 526/344.1 |
| 3,926,910 | 12/1975 | Mowdood | 526/236 |
| 3,956,251 | 5/1976 | Feiler | 526/73 |
| 4,058,495 | 11/1977 | Serratore | 526/88 |
| 4,217,444 | 8/1980 | Pompon | 526/344.1 |
| 4,455,413 | 6/1984 | Tomishima | 526/344.2 |

*Primary Examiner*—Christopher Henderson
*Attorney, Agent, or Firm*—Armstrong, Nikaido, Marmelstein, Kubovcik & Murray

[57] ABSTRACT

The present invention provides a process for producing vinyl chloride resin in suspension polymerization of vinyl chloride monomer by the use of a polymerization reactor equipped with a reflux condenser using an improved brumagine-type impeller equipped with auxiliary blade/s, and polymerization is started in a range of 0.8 to 1.0 of the water/monomer ratio, polymerization temperature is raised to 3° to 10° C. at polymer conversion being not more than 50 weight percent, with water being added in the course of polymerization not more than making up for the volumetrical contraction resulting from the progress of polymerization so that upon completion of polymerization the water/monomer ratio is controlled in a range of 1.0 to 1.4. The polyvinyl chloride resin obtained by the present process is superior in quality such as high bulk density and little fish eye with high productivity.

9 Claims, 3 Drawing Sheets

PROCESS FOR SUSPENSION POLYMERIZATION OF VINYL CHLORIDE IN A REACTOR EQUIPPED WITH A REFLUX CONDENSER AND A MODIFIED BRUMAGING IMPELLER

This application is a continuation of application Ser. No. 816,529 filed 1/6/89, now abandoned.

BACKGROUND OF THE INVENTION

1. Field of the Invention

The present invention relates to a process for producing vinyl chloride resin, and more particularly to a process for producing vinyl chloride resin high in polymerization productivity, high in bulk density and with less fish eye by the use of a polymerization reactor equipped with a reflux condenser.

2. Description of the Prior Art

In the production of vinyl chloride resin it is often the case that a reflux condenser is used for improving productivity as well as for energy-saving but this is accompanied by problems that suspension polymerization under cooling by a reflux condenser often causes an increased porosity in the particle interior and affected smoothness of the particle's surface and the resulting deterioration of the filling property causes lowering of the bulk density and an increase of fish eye. As to bulk density, it is well known that it is correlated with vinyl chloride resin's productivity in processing and lowering of bulk density is known to cause lowering of extruder's output to thus result in aggravation of productivity in processing. As means of improving polyvinyl chloride's bulk density there is known, for instance, a method of adding vinyl chloride monomer in the course of polymerization (Japanese Laid-Open Pat. App. No. 97679/75) but the vinyl chloride resin obtained by this process is known to have many fish eyes and, moreover, the residual monomer in the resin is difficult to remove.

Meanwhile, the market's need for less fish eye of vinyl chloride resin (hereinafter referred to as "PVC") has been getting more severe year after year and general tendency is that fish eye of PVC plasticized with a high polymer plasticizer of relatively low plasticizing ability and high viscosity such as of polyester series is being taken up as problematic. In order to solve the problem of fish eye, it is recommended to prevent formation of low-porosity particles caused by low dispersion frequency through best possible improvement of dispersion-coalescence frequency of monomer droplets and also to improve the homogeneity of particles in the polymerized system through local monomer addition polymerization due to monomer condensed in the reflux condenser taking place in the top layer of polymer suspension through inhibition of bubbling in the middle stage of polymerization and thereafter. When a reflux condenser is used, gas generating from the monomer droplets are contained in the polymer suspension to result in lower homogeneity attainable by stirring and results in aggravation of fish eye through bubbling phenomenon in which polymer particles form a floating creamy layer on the polymer suspension in the middle stage of polymerization and thereafter.

Further, when the bubbling phenomenon is marked, there is caused another problem that the polymer suspension overflows into the reflux condenser and its piping to cause deposition of scales to adversely affect the product's quality, also causing lowering of the heat-removing capacity of the reflux condenser and seriously affecting the safety control of the producing process.

SUMMARY OF THE INVENTION

The object of the present invention is to provide a process for producing PVC by the use of a polymerization reactor equipped with a reflux condenser safe from the above-mentioned problems of the conventional process, higher in bulk density and with less fish eye.

Another object of the present invention is to provide a process for producing PVC with less fish eye by the use of a high polymer plasticizer.

Still another object of the present invention is to provide a process for producing PVC with less bubbling phenomenon, being capable of increasing the monomer charge without risk of suspension overflowing into the piping and the interior of reflux condenser and shortened in the time required for polymerization, these together resulting in a high productivity of PVC.

Further objects and features of the present invention will be apparent from a reading of the following description.

After their intensive studies the present inventors discovered to complete the present invention that the above objects can be accomplished by controlling the water/monomer ratio within a fixed range, modifying the polymerization temperature in the course of polymerization and further by the use of special stirring blades.

DETAILED DESCRIPTION OF THE INVENTION

Figure 1:
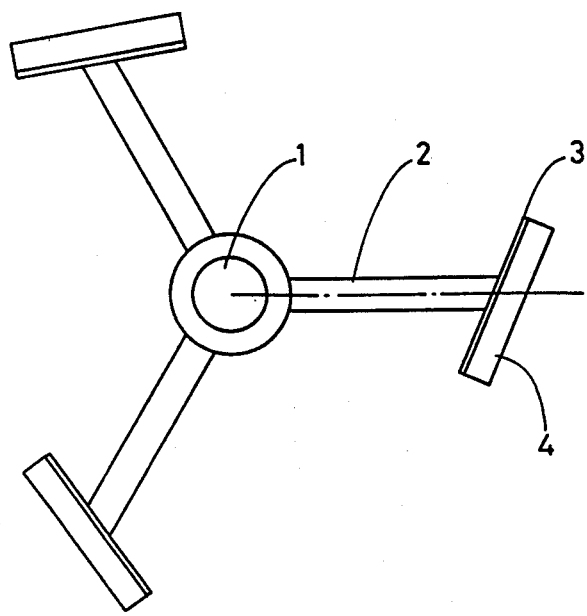
FIG. 1 is a plane view of the stirring blades used in the process of the present invention.

The present invention relates to a process for producing PVC wherein in suspension polymerization of vinyl chloride monomer and other monomers capable of copolymerizing therewith by the use of a polymerization reactor equipped with a reflux condenser in the gas phase portion of the polymerization reactor or outside the polymerization reactor stirring blades are used, each thereof being a by rumagine-type impeller with an auxiliary blade inclined with respect to the level rotary direction standing on the outer surface of a main blade attached to the tip thereof, the water/monomer ratio of initial charging is controlled in a range of 0.8–1.0, polymerization is conducted in the first stage of polymerization to not more than 50 weight percent in polymer conversion, then the second stage of polymerization is conducted at a temperature 3°–10° C. higher than the polymerization temperature in the first stage, with water being added continuously or intermittently in the course of polymerization not more than making up for the volumetrical contraction resulting from the progress of polymerization so that upon completion of polymerization the water/monomer ratio is controlled in a range of 1.0–1.4.

Normally it is known that the degree of lowering of a resin's bulk density when a reflux condenser is used increases with increasing quantity of heat removed by the reflux condenser (hereinafter referred to as "Qrc") and as in the present invention (1) to set the water/monomer ratio at the time of initial charging small (i.e. increasing the charge amount of vinyl chloride monomer) and (2) to shift the polymerization temperature from a low to high level, both means enhancement of the generation of heat in the course of polymerization. Meanwhile, there is a certain innate limit to the heat removing capacity by a reactor jacket it is inevitable to increase Qrc of the reflux condenser, this supposed to be counter to the desired increase of bulk density. Surprisingly, however, the present inventors discovered that these two technical means enable substantial increase of Qrc without causing lowering of the bulk density and even marked increase of the bulk density could be hoped for, and thus completed this invention.

Brumagine-type impellers are rational means of stirring for use in suspension polymerization of vinyl chloride being capable of high-speed spinning requiring no large driving force and high in shearing effect but it was supposed to be relatively less capable of producing a vertical flow and problematic for homogeneous stirring of the system desired.

The marked improvement of PVC with regard to fish eye by the use of the stirring blades of the present invention is attributable to not only improved stirring efficiency and resultant dispersion-coalescence frequency in the early stage of polymerization and improved homogeneity of particles in the polymerization system but also to the stirring blades' capability to produce vertical flow and vortex suction effect which is effective for preventing the bubbling phenomenon characteristic owing to use of the reflux condenser as well as for improving homogeneity of polymer suspension.

The stirring blades of the present invention are described below under reference to the appended drawings showing their embodiments.

Figure 2:
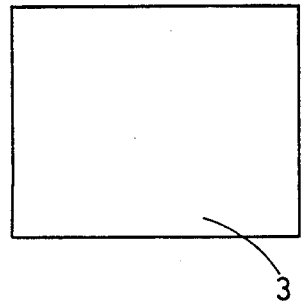
FIG. 2 is a front elevation of the main blade.
Figure 3:
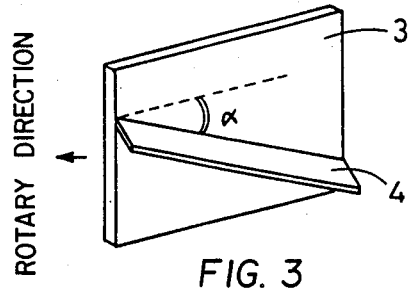
FIGS. 3 through 14 are perspective views showing the essential part of the embodiments of the stirring blades used in the process of the present invention.
Figure 4:
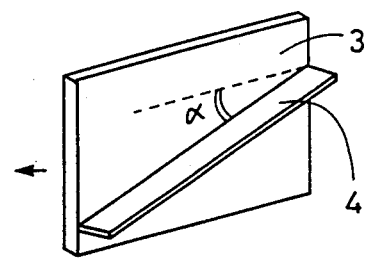
Figure 5:
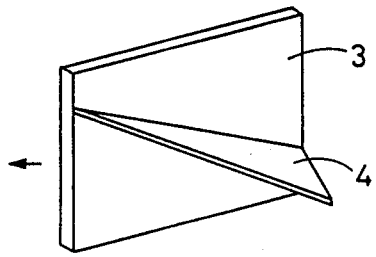
Figure 6:
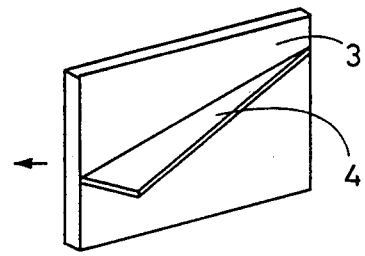
Figure 7:
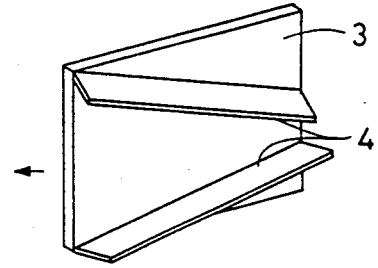

FIG. 1 is a plane view of the stirring blades of the present invention and FIG. 2 is a front view of the main blade thereof. In these figures, the main blade 3 is attached to the supporting portion 2 extending in the normal direction from the vertical shaft 1 (Brumagine-type impeller is normally in such a construction.). On the outer surface of the main blade 3 an auxiliary blade 4 is attached at a given inclination.

FIGS. 3 through 14 are perspective views showing the alternative embodiments of the main blade 3 and auxiliary blade 4 of the present invention.

In the present invention the auxiliary blade 4 is set at a given angle of inclination to the level rotary direction, that is, an angle of elevation or depression ($\alpha$). The angle of inclination is not particularly specified but generally preferred range is 5°–30°. If it is less than 5° no sufficient vertical flow can be generated to result in insufficient general stirring effect, while when it is more than 30°, it is likely to result in generation of too vigorous vertical flow, this causing too much power consumption and also an excessive dispersion with a risk of abnormal polymerization The area of each auxiliary blade 4 is preferred to be in a range of 20–60% of the area of the main blade 3. If it is less than 20% the effect produced by the use of the auxiliary blade (shearing effect, stirring effect) is insufficient, whereas when it is more than 60%, too much power consumption results as well as an excessive dispersion with a risk of abnormal polymerization. Furthermore, scales are likely to deposit and a lot of effort and time are required for removal thereof.

The auxiliary blade 4 is not necessarily set perpendicular to the main blade 3 and inclined attachment within a range of 45°–135° is acceptable. The number of auxiliary blades is not specified either. It may be properly decided according to the size of the main blade 3 but normally 1–2 of them per one main blade will give a favorable result.

The shape of the auxiliary blade 4 is not particularly specified either, and as shown in the drawings it may be rectangular, rhombic or triangular if it has a specified surface area. It need not be formed to cover the entire width of the main blade 3 and may as well be interrupted. Its thickness, too, is not particularly specified and may be properly decided according to the sizes of the main blade 3 and auxiliary blade 4 etc. When more than one auxiliary blade are set to one main blade, they are not necessarily of the same shape and dimensions and those of different shapes and dimensions may as well be used.

The auxiliary blade 4 may be welded to the main blade 3 to be monoblock therewith or prepared separately and secured together by mechanical means such as bolting.

The present invention features setting the water/monomer ratio at the time of initial charging within a range of 0.8–1.0 and controlling the water/monomer ratio upon completion of polymerization within a range of 1.0–1.4, preferably within a range of 1.0–1.2, by adding water continuously or intermittently in the course of polymerization with care not to exceed the volumetrical contraction resulting from the progress of polymerization.

The addition of water is to be done continuously or intermittently to make up for the volumetrical contraction resulting from progress of polymerization, but it is preferred to be done continuously when stability of the product's quality, controllability of inside temperature and desired prevention of bubbling etc. are taken into consideration.

The volumetrical contraction resulting from progress of polymerization ($\Delta V$) is the quantity calculated by the following formula.

$$\Delta V = (\text{Monomer charging}) \times (\text{Conversion}) \times [(1/\text{monomer density}) - (1/1.4)]$$

When the water/monomer ratio at the time of initial charging is less than 0.8, coarse particles generate, while when it is in excess of 1.0, reduced is the bulk density increasing effect.

When the water/monomer ratio upon completion of polymerization is less than 1.0, particle size becomes rough and bulk density tends to get lower, whereas, when the amount of water added should be more than enough to make up for the volumetrical contraction, it results in increase of slurry volume in the polymerization system to result in extreme cases in overflowing of the polymer slurry into the piping or the interior of the reflux condenser to cause deposition of scales and this results in deterioration of quality (fish eye). Hence, the water/monomer ratio upon completion of polymerization should be not more than 1.4, preferably not exceeding 1.2.

Further, the present invention features that polymerization is conducted in the first stage to not more than 50 weight percent in terms of polymer conversion and polymerization in the second stage is conducted at a temperature 3°–10° C. higher than in the first stage. The conversion when the polymerization temperature is changed is not more than 50 weight percent, preferably 10–50 weight percent and more preferably 15–50 weight percent. If it is less than 10 weight percent, fish eye tends to increase, while, when it is in excess of 50 weight percent, bulk density increasing effect is reduced.

As other monomers which can be copolymerized with vinyl chloride in the process of the present invention there are cited, for instance, olefins such as ethylene and propylene, vinyl esters such as vinyl acetate and vinyl stearate, (meth)acrylate esters such as methyl acrylate and methyl methacrylate, esters or anhydrides of acids such as maleic acid and fumaric acid, nitrile compounds such as acrylonitrile and vinylidene compounds such as vinylidene chloride.

As polymerization initiators used in the process of the present invention, there are included initiators normally used for suspension polymerization of vinyl chloride namely organic peroxides such as lauroyl peroxide, 3,5,5-trimethylhexanoyl peroxide, t-butyl peroxypivalate, t-butyl peroxyneodecanoate, di-isopropyl peroxydicarbonate, di-2-ethylhexyl peroxydicarbonate and acetyl cyclohexylsulfonyl peroxide, and azo compounds such as $\alpha, \alpha'$-azobis-isobutylonitrile and $\alpha, \alpha'$-azobis-2,4-dimethyl valeronitrile. These are used signly or in combination with two or more.

As suspending agents used in the process of the present invention are cited known suspending agents such as partially saponified polyvinyl alcohol, vinyl acetate-maleic anhydride copolymer, styrene-maleic anhydride copolymer, polyvinyl pyrolidone, gelatine, starch, methyl cellulose, hydroxypropyl methylcellulose and polyethylene oxide either alone or in combination but of these, preferred are partially saponified polyvinyl alcohol and/or hydroxypropyl methylcellulose in quality, polymerization stability etc. Preferred dose of the above-mentioned suspending agent is 0.01–1 weight part per 100 weight parts of vinyl chloride monomer, although there is no particular limit to it.

In the process of the present invention it is also possible to use a molecular weight adjusting agent.

The initiator, suspending agent and molecular weight adjusting agent etc. may be added at once to the polymerization system at the beginning of polymerization and it is as well possible to add them in portions in the course of polymerization.

The polymerization temperature in the process of the present invention may normally be in a range of 40°–75° C., although there is no particular limit to it.

According to the present invention, it is possible to conduct suspension polymerization by the use of a polymerization reactor equipped with a reflux condenser for production of PVC high in bulk density with less fish eye and it is also possible to increase the monomer charge without risk of suspension overflowing into the piping or the interior of reflux condenser, which along with shortening of the polymerization time enables sizable improvement of productivity, the industrial significance of the present invention being thus remarkable.

Hereafter examples of the present invention are given as well as control examples but these mean no limitation of the present invention.

In the description below evaluation of the product's quality was made by the following methods.
Bulk density: According to JIS K-6721.
Particle size distribution: Sifting and shaking method.
Porosity: Porosity was determined by the use of mercury compression type porosimeter of Aminco Inc., U.S.A. (Model 5-7118) through measurement of the volume of mercury pressed in per 100 g PVC at an absolute pressure of 31–1011 psi (pore size 0.17–5.8 μm).
Fish eye: 100 weight parts of PVC obtained by polymerization, 50 weight parts of plasticizer [PN 250 (adipic acid-type polyester: molecular weight approx. 2,000), maker: Adeca Argus Inc.], 3 weight parts of tribase, 0.5 weight parts of stearic acid, 0.4 weight parts of titanium dioxide and 0.2 weight parts of carbon black were mixed, after still-standing for 3 hours the mixture was milled through 8 inch rolls at 150° C. (sheet thickness: 0.2 mm). Sheets were cut out after 8 minutes and 10 minutes of milling and the number of transparent particles (fish eyes) per 5 cm×5 cm sheet were counted.

EXAMPLE 1

Figure 8:
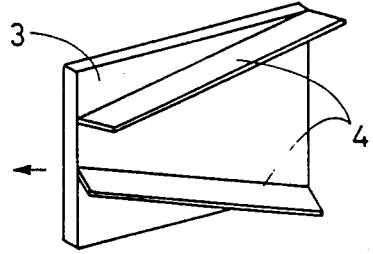
Figure 9:
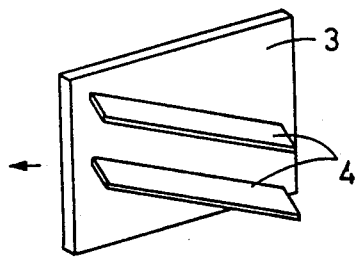
Figure 10:
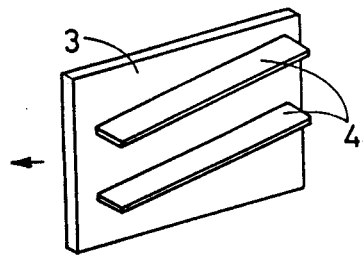
Figure 11:
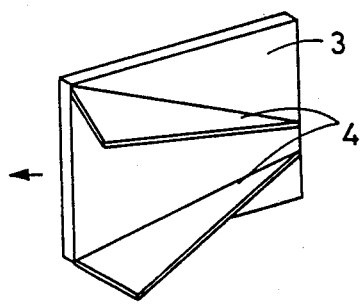
Figure 12:
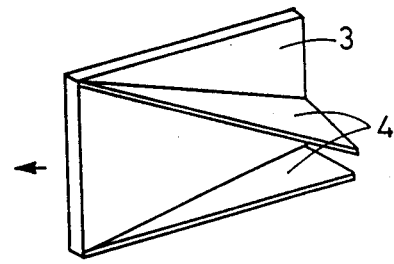

90 weight parts of water having dissolved in it 0.07 weight parts of partially saponified polyvinyl alcohol were charged into a polymerization reactor 1.7 m$^3$ in capacity provided with Brumagine-type impeller having attached thereto auxiliary blades as shown in FIG. 8 and also equipped with a reflux condenser having a heat transfer area of 5 m$^2$, 0.024 weight parts of di-2-ethylhexyl peroxy-di-carbonate and 0.024 weight parts of t-butyl peroxy-neodecanoate were added as initiators, 100 weight parts of vinyl chloride monomer (682 kg) was charged after deaeration, the temperature was raised to 54° C. (polymerization temperature in the first stage) for polymerization to start, flow of cooling water was started through the reflux condenser when the polymer conversion reached 3% and polymerization was conducted with Qrc being adjusted to 27,500 kcal/hr from the 30 minutes on after the start of flowing cooling water. When the polymer conversion has reached 35%, the polymerization temperature was raised to 59° C. (polymerization temperature in the 2nd stage) and polymerization was continued with Qrc readjusted to 40,000 kcal/hr, the operation of the reflux condenser was stopped when the inside pressure lowered 1 kg/cm$^2$ from the steady pressure corresponding to the polymerization temperature in the 2nd stage to recover the unpolymerized monomer, the slurry was then dehydrated and dried in a fluidized bed drier for PVC to be obtained. From immediately after the start of polymerization, water was continuously added at a constant rate by the use of a reciprocating pump all through the period of polymerization so that the water/monomer ratio at the start of recovery (upon completion of polymerization) was adjusted to 1.1 (total amount of water added: 20 weight parts).

The resulting PVC was quite satisfactory with regard to bulk density and fish eye as shown in Table 1 with no indication of polymer suspension overflowing into the reflux condenser.

EXAMPLE 2

Figure 13:
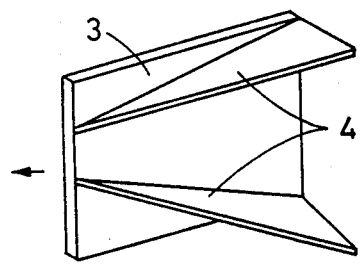
Figure 14:
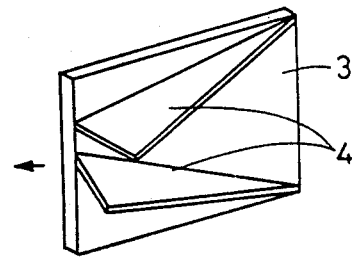

Polymerization was conducted in the same way as Example 1 except that the auxiliary blades were changed to what are shown in FIG. 13 and the resulting polymer was dehydrated and dried.

The resulting PVC was satisfactory with regard to bulk density and fish eye as shown in Table 1 with no indication of polymer suspension overflowing into the reflux condenser.

EXAMPLE 3

Polymerization was conducted in the same way as Example 1 except that the polymerization temperature was changed when the conversion reached 50% and the polymer was dehydrated and dried.

The resulting PVC was satisfactory with regard to bulk density and fish eye as shown in Table 1 with no indication of overflowing of polymer suspension into the reflux condenser.

EXAMPLE 4

Polymerization was conducted in the same way as Example 1 except that the polymerization temperature in the first stage was adjusted to 52° C. and that in the second stage to 62° C. and the Qrc of the reflux condenser at the polymerizing temperatures in the first and second stages were adjusted to 22,500 kcal/hr and 47,500 kcal/hr respectively and the polymer was dehydrated and dried.

The resulting PVC was satisfactory with regard to bulk density and fish eye as shown in Table 1 with no indication of overflowing of polymer suspension into the reflux condenser.

EXAMPLE 5

Polymerization was conducted in the same way as Example 1 except that the water/monomer ratio at the time of initial charging was adjusted to 1.0 without changing total charging volume and 651 kg of vinyl chloride monomer was charged and water was added so that the water/monomer ratio at the time of starting recovery of unpolymerized monomer was adjusted to 1.4 (total amount of water added: 40 weight parts) and Qrc at the polymerization temperatures in the first and second stages were adjusted to 26,500 kcal/hr and 38,000 kcal/hr respectively and the polymer was dehydrated and dried.

The resulting PVC was satisfactory with regard to bulk density and fish eye as shown in Table 1 with no indication of overflowing of polymer suspension into the reflux condenser.

CONTROL EXAMPLE 1

Polymerization was conducted in the same way as Example 1 except that ordinary Brumagine-type impeller was used with no auxiliary blade. The resulting PVC contained a lot of fish eyes. The result is shown in Table 1.

CONTROL EXAMPLE 2

Polymerization was conducted in the same way as Example 1 except that the polymerization temperature was changed when the conversion reached 60%. The resulting PVC was low in bulk density.

CONTROL EXAMPLE 3

Polymerization was conducted in the same way as Example 1 except that the polymerization temperature was set at 57° C. for both first and second stages and Qrc was adjusted to 34,000 kcal/hr. The resulting PVC was low in bulk density.

CONTROL EXAMPLE 4

Polymerization was conducted in the same way as Example 1 except that the polymerization temperature in the first stage was set at 49.5° C. and that in the second stage at 65° C. and Qrc at the polymerization temperatures in the first and second stages was adjusted to 17,000 kcal/hr and 51,000 kcal/hr respectively. The resulting PVC had a lot of fish eyes.

CONTROL EXAMPLE 5

Polymerization was conducted in the same way as Example 1 except that the water/monomer ratio at the time of initial charging was adjusted to 0.7 without changing total charging volume rate and 755 kg of vinyl chloride monomer was charged and water was added so that the water/monomer ratio at the time of starting recovery was adjusted to 1.1 (total amount of water added: 40 weight parts) and Qrc at the polymerization temperatures in the first and second stages were adjusted to 30,000 kcal/hr and 44.000 kcal/hr respectively. The resulting PVC contained a lot of coarse particles.

CONTROL EXAMPLE 6

Polymerization was conducted in the same way as Example 1 except that the water/monomer ratio at the time of initial charging was adjusted to 1.1 without changing total charging volume (charged quantity of vinyl chloride monomer: 622 kg) and water was added so that the water/monomer ratio at the time of starting recovery was adjusted to 1.4 (total amount of water added: 30 weight parts) and Qrc at the polymerization temperatures in the first and second stages were adjusted to 25,400 kcal/hr and 36,000 kcal/hr respectively. The resulting PVC was low in bulk density.

CONTROL EXAMPLE 7

Polymerization was conducted in the same way as Example 1 except that ordinary Brumagine-type impeller without any auxiliary blade were used, the water/monomer ratio at the time of initial charging was adjusted to 1.2 without changing total charging volume (charged quantity of vinyl chloride monomer: 600 kg) and no water was added in the course of polymerization and Qrc was adjusted to 30,000 kcal/hr throughout the polymerization. The resulting PVC was low in bulk density and had a lot of fish eyes.

CONTROL EXAMPLE 8

120 weight parts of water having dissolved in it 0.07 weight parts of partially saponified polyvinyl alcohol was charged into a polymerization reactor 1.7 m$^3$ in capacity provided with ordinary Brumagine-type impeller without any auxiliary blade, 0.024 weight parts of di-2-ethylhexyl peroxy-di-carbonate and 0.024 weight parts of t-butyl peroxyneodecanoate were added as initiators, 100 weight parts of vinyl chloride monomer (600 kg) was charged after deaeration, the temperature was raised to 57° C. for polymerization to start, unpolymerized monomer was recovered when the inside pressure lowered 1 kg/cm$^2$ from the steady pressure corresponding to the polymerization temperature, then slurry was dehydrated and dried in a fluidized bed drier for PVC to be obtained. In the course of polymerization no addition of water was made and no reflux condenser was used. The resulting PVC was 0.525 in bulk density and contained 75 fish eyes at 8th minute and 23 at 10th minute.

TABLE 1

| | Example | | | | | Control Example | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| Reflux condenser | Used | " | " | " | " | " | " | " | " | " | " | " | Not used |
| Auxiliary blade | FIG. 8 | FIG. 13 | FIG. 8 | " | " | None | FIG. 8 | " | " | " | " | None | None |
| Shape | Rectang. | " | " | " | " | None | Rectang. | " | " | " | " | None | None |
| Number/one main blade | 2 | " | " | " | " | None | 2 | " | " | " | " | None | None |
| Angle/elevation (α) | 20 | " | " | " | " | None | 20 | " | " | " | " | None | None |
| Area % against main blade/aux. blade | 30 | " | " | " | " | None | 30 | " | " | " | " | None | None |
| Water/monomer ratio | | | | | | | | | | | | | |
| Time/initial charging | 0.9 | " | " | " | 1.0 | 0.9 | " | " | " | 0.7 | 1.1 | 1.2 | " |
| Start of recovery | 1.1 | " | " | " | 1.4 | 1.1 | " | " | " | 1.1 | 1.4 | 1.2 | " |
| Initial charge/monomer (kg) | 682 | " | " | " | 651 | 682 | " | " | " | 755 | 622 | 600 | " |
| Water added (wt. %) | 20 | " | " | " | 40 | 20 | " | " | " | 40 | 30 | — | — |
| Polymerizing temp. (°C.) | | | | | | | | | | | | | |
| 1st stage | 54 | " | " | 52 | 54 | " | 54 | 57 | 49.5 | 54 | 54 | 57 | 57 |
| 2nd stage | 59 | " | " | 62 | 59 | " | 59 | 57 | 65 | 59 | 59 | 57 | 57 |
| Time of changing temp. (Conversion %) | 35 | " | 50 | 35 | " | " | 60 | — | 35 | 35 | 35 | — | — |
| Qrc (kcal/hr) | | | | | | | | | | | | | |
| 1st stage | 27500 | " | " | 22500 | 26500 | 27500 | 27500 | 34000 | 17000 | 30000 | 25400 | 30000 | — |
| 2nd stage | 40000 | " | " | 47500 | 38000 | 40000 | 40000 | 34000 | 51000 | 44000 | 36000 | 30000 | — |
| Particle size distribution (%) | | | | | | | | | | | | | |
| 60 mesh on | 0 | 0 | 0 | 0 | 0 | 0 | 0 | 0 | 0 | 17 | 0 | 0 | 0 |
| 60–100 mesh | 21 | 23 | 22 | 20 | 19 | 20 | 19 | 20 | 22 | 51 | 15 | 12 | 11 |
| 100–145 mesh | 63 | 61 | 63 | 63 | 62 | 65 | 65 | 64 | 63 | 30 | 72 | 70 | 68 |
| 145–200 mesh | 14 | 15 | 13 | 16 | 17 | 13 | 15 | 15 | 15 | 2 | 12 | 17 | 20 |
| 200 mesh pass | 2 | 1 | 2 | 1 | 2 | 2 | 1 | 1 | 1 | 0 | 1 | 1 | 1 |
| Porosity cc/100 g | 24.5 | 24.3 | 24.7 | 24.0 | 25.0 | 24.0 | 26.0 | 25.5 | 21.5 | — | 26.0 | 27.5 | 25.0 |
| Bulk density | 0.535 | 0.536 | 0.530 | 0.538 | 0.530 | 0.535 | 0.515 | 0.513 | 0.545 | — | 0.519 | 0.500 | 0.525 |
| Fish eye (piece/5 cm × 5 cm) | | | | | | | | | | | | | |
| 8th minute | 73 | 76 | 70 | 75 | 68 | 352 | 70 | 68 | 250 | — | 66 | 325 | 75 |
| 10th minute | 19 | 21 | 15 | 20 | 17 | 130 | 14 | 15 | 100 | — | 13 | 125 | 23 |

What is claimed is:

1. A process for producing vinyl chloride resin in a suspension polymerization system of vinyl chloride monomer and other monomers capable of copolymerizing therewith by the use of a polymerization reactor equipped with a reflux condenser in the gas phase portion of the polymerization reactor or outside the polymerization reactor, the improvement which comprises using stirring blades, each thereof being a Brumagine-type impeller comprising arms and main blades, each main blade being provided with at least one auxiliary blade which extends radially outwardly and is inclined with respect to a horizontal plane swept by said arms, controlling a water/monomer ratio of initial charging within a range of 0.8–1.0, conducting polymerization in the first stage of polymerization to not more than 50 weight percent in polymer conversion, then conducting polymerization in the second stage of polymerization at a temperature 3°–10° C. higher than the polymerization temperature in the first stage, with water being added continuously or intermittently in the course of polymerization not more than making up for the volumetrical contraction resulting from the progress of polymerization so that upon completion of polymerization the water/monomer ratio is controlled in a range of 1.0–1.4.

2. A process of claim 1, wherein the water/monomer ratio upon completion of polymerization is controlled within a range of 1.0–1.2.

3. A process of claim 1, wherein in the first stage of polymerization, polymer conversion of 10–50 weight percent is reached.

4. A process of claim 1, wherein at least one of a partially saponified polyvinyl alcohol and hydroxypropyl methylcellulose is used as suspending agent.

5. A process of claim 1, wherein at least one auxiliary blade inclines 5°–30°, angle of elevation or depression, with respect to said horizontal plane.

6. A process of claim 1, wherein the area of one auxiliary blade is 20–60% of the area of one main blade.

7. A process of claim 1, wherein at least one auxiliary blade is perpendicular to or inclined at 45°–135° with respect to the main blade.

8. A process of claim 1, wherein at least one auxiliary blade is provided per one main blade.

9. A process of claim 1, wherein the shape of the auxiliary blade is rectangular, rhombic or triangular.

* * * * *

UNITED STATES PATENT AND TRADEMARK OFFICE
CERTIFICATE OF CORRECTION

PATENT NO. : 4,849,482

DATED : July 18, 1989

INVENTOR(S) : KOBAYASHI et al

It is certified that error appears in the above-identified patent and that said Letters Patent is hereby corrected as shown below:

On the cover page, Item [73], "Kanegafuchi Kagaki Kogyo Kabushiki Kaisha" should read --Kanegafuchi Kagaku Kogyo Kabushiki Kaisha--.

Signed and Sealed this

Third Day of April, 1990

*Attest:*

HARRY F. MANBECK, JR.

*Attesting Officer*   Commissioner of Patents and Trademarks

UNITED STATES PATENT AND TRADEMARK OFFICE
CERTIFICATE OF CORRECTION

PATENT NO. : 4,849,482

DATED : July 18, 1989

INVENTOR(S) : KOBAYASHI et al

It is certified that error appears in the above-identified patent and that said Letters Patent is hereby corrected as shown below:

On the cover page, Item [54], line 5, "BRUMAGING" should read --BRUMAGINE--.

Column 1, line 5, "BRUMAGING" should read --BRUMAGINE--.

Signed and Sealed this

Fourteenth Day of August, 1990

Attest:

HARRY F. MANBECK, JR.

*Attesting Officer*   *Commissioner of Patents and Trademarks*